Patented Aug. 26, 1952

2,608,545

UNITED STATES PATENT OFFICE 2,608,545

SILOXANE PUTTY

Earl L. Warrick, Pittsburgh, Pa., assignor to Dow Corning Corporation, Midland, Mich., a corporation of Michigan No Drawing. Application June 2, 1950, Serial No. 165,879

1 Claim. (Cl. 260—37)

This application relates to siloxane putty and caulking compounds.

One of the chief disadvantages of heretofore employed putties and caulking compounds is the fact that these materials gradually harden and crack due to action of atmospheric oxygen. This is a serious disadvantage in many applications, particularly in the sealing of large glass windows such as store fronts. As a result of this hardening, the sealing compound cracks and allows the entrance of water. Consequently, it is necessary to periodically remove the glass in order to reseal the joint. In the case of large plate glass windows, this involves considerable labor costs.

Aluminum frame windows are of great utility in homes, particularly since the metal does not require painting. However, it is necessary to paint the putties heretofore employed in order to prevent them from cracking. Hence, one of the chief advantages of the aluminum window is lost.

It is an object of this invention to provide a putty and caulking compound which does not harden and crack upon exposure to the atmosphere. Another object is to provide a material which will permanently seal glass windows. Another object is to provide a sealing compound which is useful over a wide range of temperature. Another object is to eliminate the expense and inconvenience of replacing sealing compounds.

This invention relates to a sealing compound composed essentially of a benzene soluble polymeric organosiloxane having a viscosity of at least 100,000 cs. at 25° C., from 100 to 500 parts by weight of a heat stable inorganic filler, and from 1 to 20 parts by weight of a silica powder having a pore volume of at least 4 ccs. per gram, and a heat of wetting by water of from 0.3 to 1 calorie per cc. of pore volume.

The polymers employed in this invention are benzene soluble polymeric siloxanes having a viscosity of at least 100,000 cs. The polymers range in consistency all the way up to solid non-flowing materials. Such polymers contain principally diorganosiloxane units in which the organic radicals are alkyl and monocyclic aryl. In addition, the polymers may contain limited amounts of siloxane units of the type $RSiO_{3/2}$ or $R_3SiO_{1/2}$ in which R is alkyl or monocyclic aryl. It is necessary, however, that the polymer be in such a state that when compounded with the filler it will give a plastic material which can be applied readily. This may be accomplished with the non-flowing solid polymers by employing a solvent. Thus, the polymer should not be in the form of a tough insoluble gum.

The polymer and filler may be mixed in any desired manner, but good results are obtained by milling. Fillers which are operative in this invention are inorganic heat stable materials such as diatomaceous earth, clay, iron oxide, alumina, titania, calcium carbonate, and zinc oxide. The amount of these fillers which is employed will vary with the viscosity of the polymer and with the consistency desired in the finished product.

It has been found that when the above described siloxanes and fillers are compounded in such amount as to give a consistency desired for a caulking compound, that the resulting material exhibits cold flow. This, of course, is highly objectionable. Consequently, in order to produce a satisfactory sealing compound, it is necessary to employ from 1 to 20 parts by weight based on the weight of the siloxane of a silica powder having a pore volume of at least 4 ccs. per gram, and a heat of wetting by water of from 0.3 to 1 calorie per cc. of pore volume. This type of filler is produced by well known methods such as burning trichlorosilane or a mixture of silicon tetrachloride and hydrogen, and cooling the silica so produced. Alternatively, such silicas may be prepared by the well known aerogel process.

The pore volume of the silicas is determined by placing a weighted sample of the filler in a vessel and determining the weight of water required to fill the vessel. The operation is then repeated with mercury and the weight of mercury determined. The volume of water in the vessel minus the volume of mercury gives the pore volume of the sample. This is then converted to ccs. per gram based upon the weight of the sample.

The heat of wetting by water is determined by placing a weighted sample of water in a calorimeter. A weighted sample of the silica filler, having the same temperature as the water in the calorimeter is then added to the water. The temperature rise is noted and converted to the heat of wetting by the formula $$H_w = \frac{\Delta T}{W_s}(H + H_1 \times W_1 + 0.188 W_s)$$

where $H_w$ is the heat of wetting in calories per gram, $\Delta T$ is the temperature rise in the degrees C, $W_s$ is the weight of silica, H is the calorimeter constant, $H_1$ is the specific heat of water, and $W_1$ is the weight of water. The constant 0.188 is the specific heat of quartz. The heat of wetting in calories per gram is then converted into calories per cc. of pore volume by dividing $H_w$ by the pore volume of the silica expressed in ccs. per gram.

Sealing compounds prepared in accordance with this invention remain permanently soft and non-cracking over a temperature range from below −80° F. to above 300° F. They are sufficiently plastic that they may be readily applied with a putty knife or caulking gun, and yet exhibit no cold flow. As far as is known, the performance of these materials is outstandingly superior to any heretofore known sealing compounds.

If desired, pigments may be included in the composition of this invention to impart color thereto.

The following examples are illustrative only, and should not be considered as limiting the invention.

*Example 1*

100 parts by weight of a non-flowing benzene soluble dimethylsiloxane polymer, 300 parts by weight diatomaceous earth, and 5 parts by weight of a silica powder having a pore volume of 9.77 ccs. per gram, and a heat of wetting of 0.72 calories per cc. of pore volume were compounded in a mill until the ingredients were thoroughly mixed. The resulting product was soft and extrudable but exhibited no cold flow.

The material was used to caulk an aquarium, and after 4 days standing, no leaks had appeared.

The compound was employed as a putty in unpainted aluminum windows, and after 9 months there was no hardening or cracking of the putty. The windows showed no leakage during rain.

*Example 2*

100 parts by weight of a copolymer siloxane having the composition 95 mol per cent dimethylsiloxane and 5 mol per cent phenylmethylsiloxane, which polymer had a plasticity of 30 (as determined by ASTM–D–926–47T), was milled with 260 parts by weight of diatomaceous earth and 1 part by weight based on the siloxane of a silica aerogel having a heat of wetting of 0.655 calorie per cc. of pore volume, and a pore volume of 7.32 ccs. per gram. The milled material had a consistency of soft putty and was employed to seal the plate glass windows of a store. The seal so obtained was satisfactory.

That which is claimed is:

A sealing compound comprising (1) an organopolysiloxane in which the organic radicals are selected from the group consisting of alkyl and monocyclicaryl radicals, said siloxane being benzene soluble and having a viscosity of at least 100,000 cs. at 25° C., (2) from 1 to 20 parts by weight based upon 100 parts by weight of (1) of a silica powder having a pore volume of at least 4 cc. per gram and a heat of wetting of from 0.3 to 1 calorie per cc. of pore volume, and (3) from 100 to 500 parts by weight based upon 100 parts by weight of (1) of a filler other than (2).

EARL L. WARRICK.

REFERENCES CITED

The following references are of record in the file of this patent:

UNITED STATES PATENTS

| Number | Name | Date |
|---|---|---|
| 2,428,608 | Bass | Oct. 7, 1947 |